United States Patent
Prakash et al.

(10) Patent No.: US 12,010,758 B2
(45) Date of Patent: Jun. 11, 2024

(54) DYNAMIC USER EQUIPMENT (UE) GROUP CREATION TO COORDINATE DEVICES

(71) Applicant: Cisco Technology, Inc., San Jose, CA (US)

(72) Inventors: Aditya Prakash, Karnataka (IN); Ravi Shekhar, Maharashtra (IN); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/319,737

(22) Filed: May 18, 2023

(65) Prior Publication Data
US 2023/0292103 A1  Sep. 14, 2023

Related U.S. Application Data

(63) Continuation of application No. 17/386,680, filed on Jul. 28, 2021, now Pat. No. 11,706,608.

(51) Int. Cl.
*H04W 8/18* (2009.01)
*H04W 8/20* (2009.01)
*H04W 28/24* (2009.01)

(52) U.S. Cl.
CPC ............. *H04W 8/186* (2013.01); *H04W 8/20* (2013.01); *H04W 28/24* (2013.01)

(58) Field of Classification Search
CPC ......... H04W 4/08; H04W 8/186; H04W 8/20; H04W 28/24; H04W 48/18
See application file for complete search history.

(56) References Cited

U.S. PATENT DOCUMENTS 9,629,033 B2  4/2017  Kulal
2015/0049610 A1  2/2015  Kim et al.
(Continued)

FOREIGN PATENT DOCUMENTS

| CN | 101729978 A | 6/2010 |
|----|-------------|--------|
| CN | 101729978 B | 6/2010 |
| WO | 2018202797 A1 | 11/2018 |

OTHER PUBLICATIONS

3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, 932 pages.
3GPP, "3rd Generation Partnership Project; Technical Specification Group Radio Access Network; NR; Medium Access Control (MAC) protocol specification (Release 16)", 3GPP TS 38.321 V16.3.0, Dec. 2020, 156 pages.
(Continued)

*Primary Examiner* — Khoa Huynh
(74) *Attorney, Agent, or Firm* — Edell, Shapiro & Finnan, LLC

(57) ABSTRACT

A network function selectively supports a mobile device with network settings appropriate for the device context of the mobile device. The network function obtains a device profile for the mobile device, which identifies multiple device groups, with each device group being associated with a corresponding set of network settings. The network function selects a device group among the device groups in the device profile based on a device context of the mobile device. Responsive to a notification of the mobile device in a different device context, the network function supports the mobile device with a different set of network settings that cause a Session Management Function (SMF) to reconfigure the user plane for the mobile device.

20 Claims, 7 Drawing Sheets

(56) References Cited

U.S. PATENT DOCUMENTS

| | | |
|---|---|---|
| 2015/0050955 A1 | 2/2015 | Kim et al. |
| 2015/0181481 A1 | 6/2015 | Masini et al. |
| 2015/0327127 A1 | 11/2015 | Centonza et al. |
| 2015/0341851 A1 | 11/2015 | Cai et al. |
| 2017/0303180 A1 | 10/2017 | Kapoulas et al. |
| 2018/0115932 A1 | 4/2018 | Gomes et al. |
| 2019/0021099 A1* | 1/2019 | Hamzeh ............... H04L 67/306 |
| 2019/0141167 A1 | 5/2019 | Nolan et al. |
| 2019/0166016 A1 | 5/2019 | Livanos et al. |
| 2019/0342734 A1 | 11/2019 | Palanisamy et al. |
| 2020/0154350 A1 | 5/2020 | Dao et al. |
| 2020/0367297 A1 | 11/2020 | Dao et al. |
| 2020/0389239 A1* | 12/2020 | Garcia ................. H04L 1/0009 |
| 2022/0022092 A1* | 1/2022 | Puente Pestaña ........................... H04W 28/0263 |

OTHER PUBLICATIONS

"5G NR Radio Network Temporary Identifier (RNTI)", Techplayon, https://www.techplayon.com/5g-nr-radio-network-temporary-identifier-rnti/, Nov. 5, 2018, 6 pages.

"5G NR Measurement Events", Techplayon, https://www.techplayon.com/5g-nr-measurement-events/, Feb. 26, 2020, 13 pages.

3GPP, "5G; NG-RAN; NG Application Protocol (NGAP) (3GPP TS 38.413 version 15.0.0 Release 15)", ETSI TS 138 413 V15.0.0, Jun. 2018, 256 pages.

"LTE Quick Reference", ShareTechnote, https://www.sharetechnote.com/html/Handbook_LTE_RNTI.html, downloaded Dec. 22, 2020, 7 pages.

"MacOS wireless roaming for enterprise customers", Apple, Apple Support, https://support.apple.com/en-us/HT206207, Dec. 17, 2020, 5 pages.

* cited by examiner

DYNAMIC USER EQUIPMENT (UE) GROUP CREATION TO COORDINATE DEVICES

CROSS-REFERENCE TO RELATED APPLICATIONS

This application is a continuation of U.S. patent application Ser. No. 17/386,680, filed Jul. 28, 2021, the entirety of which is incorporated herein by reference.

TECHNICAL FIELD

The present disclosure relates to wireless network systems and supporting groups of mobile devices.

BACKGROUND

User Equipment (UE) group creation is a popular concept where various UEs are grouped together and provisioned in Fifth Generation (5G) Network Functions (NFs) for a common policy and user experiences. As per the current architecture, the grouping of UEs is done statically at the time of provisioning of UEs in 5G NFs, e.g., Unified Data Management (UDM) or Home Subscriber Server (HSS).

The Third Generation Partnership Project (3GPP) has defined a UE Internal-Group identifier, but this group identifier is static in nature. Once a UE is configured for a particular group, the UE cannot leave that group unless the network re-provisions the UE. The UE Internal-Group identifier does not include dynamic group formation with dynamic policies attached to the device groups.

DESCRIPTION OF EXAMPLE EMBODIMENTS

Overview

Figure 1:
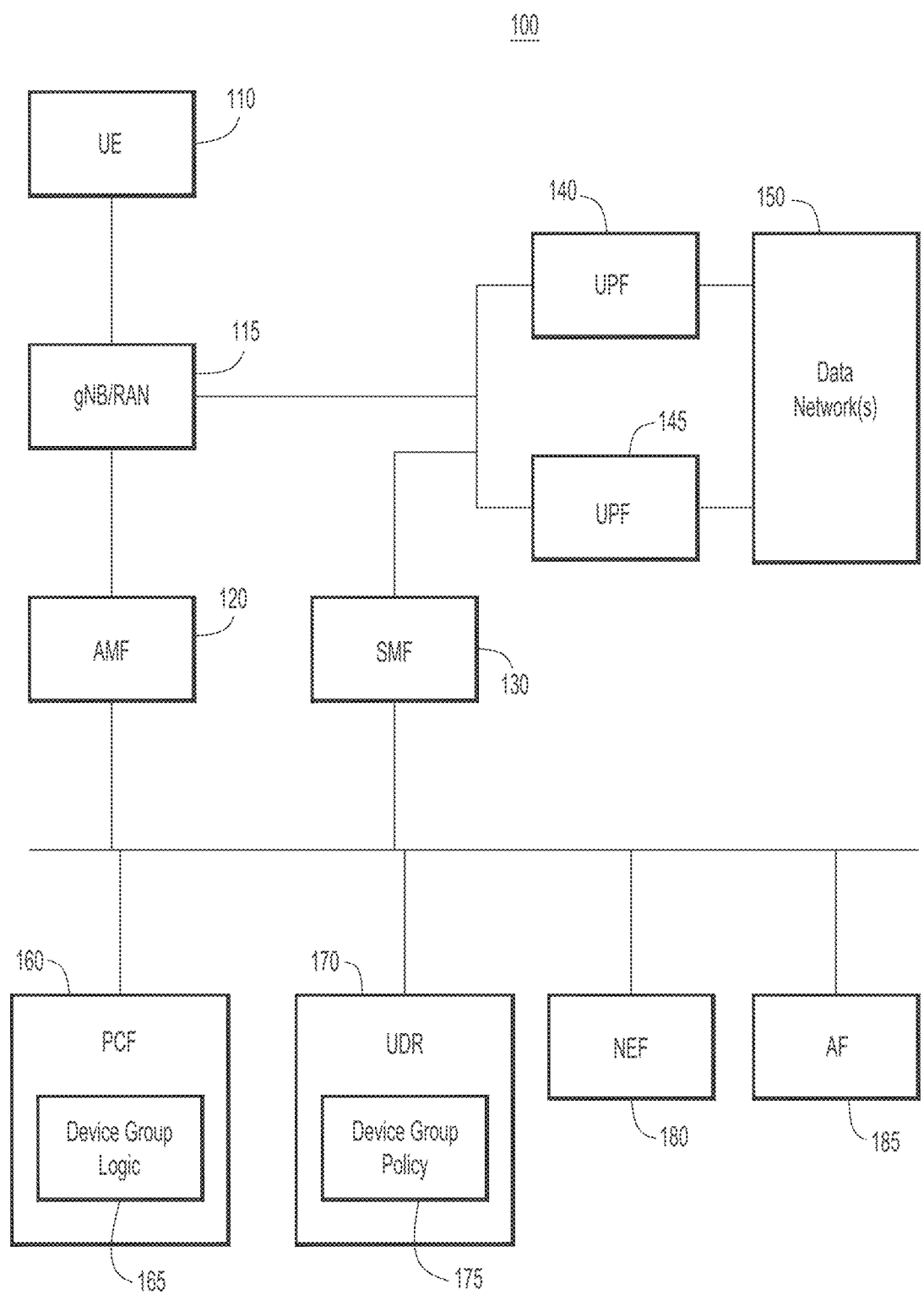
FIG. 1 is a simplified block diagram of a network system, according to an example embodiment.

A computer implemented method is provided for a network function to selectively support a mobile device with network settings appropriate for the device context of the mobile device. The method includes obtaining a device profile for the mobile device, which identifies a plurality of device groups, with each device group being associated with a corresponding set of network settings. The method also includes selecting a first device group among the plurality of device groups based on the first device context of the mobile device. The method further includes directing at least one network function in the network to support the mobile device with a first set of network settings corresponding to the first device group.

Example Embodiments

The emergence of new use cases for wireless network systems generates a demand for dynamic creation of User Equipment (UE) groups based on Quality of Service (QoS) needs. Dynamic creation of UE groups may allow Fifth Generation (5G) Network Functions (NFs) to add and remove mobile devices from various QoS groups supported by the NFs. The mobile devices may join or leave different QoS groups based on factors (e.g., physical location, application usage, time of day, operator policy, etc.) that change more often than a 5G network re-provisions the mobile device. Changing the device policy allows the mobile device to leave or to join any device group at any time without changing the configuration of the mobile device.

The Policy Control Function (PCF) of the 5G network uses the Application Function (AF) influence to determine which device group is the most appropriate for each mobile device based on the device context. Additionally, different network functions (e.g., User Plane Functions) may be selected based on the device group to allow better coordination and more predictable response time (e.g., lower latency) for traffic between mobile devices in the same device group.

The techniques presented herein enable a network function to group UEs into device groups based on the services each mobile device is requesting. A UE may belong to multiple device groups, but the network may select network settings (e.g., a QoS group) based on various factors, such as the services the UE is requesting, physical location of the UE, and/or time of day. The network may also select the same 5G NFs (e.g., Session Management Function (SMF) or UPF) based on the device group to provide the UE a better quality of experience.

In one example use case, healthcare appliances may be grouped according to their use in different healthcare settings (e.g., remote assisted surgery/operation). In a hospital setting, various types of instruments and devices are available for surgeries. Depending on current surgical needs, some of the devices/instruments may be moved between operating theaters, which may be specific to different types of surgery. For each particular surgery, the supporting network coordinates all of the devices/instruments for that particular surgery by grouping the devices/instruments and providing the same network setting (e.g., QoS group) based on the device group. The specific device group may depend upon the type of surgery and the physical location of the operating theater.

For instance, in a first operation in a first operating theater, three devices (e.g., heart monitor, blood monitor, and fluoroscope) may be required for the first operation. The network may group these three devices in a common device group while they are being used within the first operating theater. When a second operation in a second operating theater requires devices (e.g., heart monitor, blood monitor, endoscope) that may or may not be the same devices from the first operation, the network may group these devices in a different device group with different network settings. When any device (e.g., heart monitor or blood monitor) moves back and forth between operating theaters, the network switches the device group for that device and supports the device with the appropriate network settings (e.g., QoS group, NF selection) for the operating theater.

In another example use case, participants in online conferences may move into different conference rooms or other physical locations. Additionally, dedicated devices for online conferences (e.g., telepresence endpoints) may be associated with a particular physical conference room that may be used for different online conferences. The network may support a particular online conference by grouping all of the endpoint devices (e.g., group endpoints, single user endpoints, smart phones, etc.) that are participating in the particular online conference into a single device group to coordinate the traffic for the particular online conference. A mobile device may be switched to a device group dedicated to the particular online conference based on the mobile device joining the particular online conference, or based on the mobile device entering a physical conference room scheduled for the particular online conference. Once the device context of the mobile device places the mobile device in the appropriate device group for the particular online conference, the network supports the mobile device, as well as the other devices participating in the particular online conference, with network settings that coordinate and optimize the traffic for the particular online conference.

Referring now to FIG. 1, an example of a network system 100 configured to support a UE 110 (e.g., a mobile device) with dynamic device groups is shown. The UE 110 connects to the network through a Radio Access Network (RAN) 115, which may include a next generation Node B (gNB). The network system 100 also includes an Access Management Function (AMF) 120 that is configured to handle connection and mobility management tasks for the network system 100.

The network system 100 also includes an SMF 130 that is configured to manage data sessions and the session context for UEs, such as UE 110, that are attached to the network system 100. The network system 100 includes UPF 140 and UPF 145, which are configured to manage interconnecting with one or more data networks 150, as well as manage the packet handling and QoS requirements for Protocol Data Unit (PDU) sessions with the UE 110.

The network system 100 further includes a PCF 160 configured to provide policy rules for control plane functions (e.g., network slicing, roaming, etc.) in the network system 100. The PCF 160 is also configured to support QoS policy and charging functions and manage network resources based on operator policies. The PCF 160 includes device group logic 165 that enables the PCF 160 to dynamically group mobile devices (e.g., UE 110) into device groups appropriate for the context of each mobile device.

The network system 100 includes a Unified Data Repository (UDR) 170 that is configured to provide data storage services to the network system 100. The UDR 170 includes records with subscriber data, device data, and data related to network services. The UDR 170 stores the device group policy 175, which provides the PCF 160 with the device group information to make a determination on which device group the UE 110 belongs. In some instances, a Unified Data Management (UDM) element (not shown) may also be included in network system 100 to facilitate various data storage/retrieval services.

The network system 100 also includes a Network Exposure Function (NEF) 180 that is configured to provide a secure point to interface with outside entities, such as an Application Function (AF) 185. In one example, the AF 185 may be an online conferencing server or a scheduling system for operating theaters in a healthcare setting.

In one example, a network operator may define device groups to include QoS groups, each identified by a group identifier, e.g., an alphanumeric value. Each QoS groups may be associated with a different QoS profile, depending on the use case for the device group. A mobile device, such as UE 110, may be provisioned (e.g., in the UDR 170) to be part of one or more QoS groups initially. Subscription data for a mobile device may associate the subscriber with particular QoS groups.

In another example, multiple mobile devices (e.g., UE 110) in the same use case (e.g., participating in an online conference) may be assigned to the same device group. The PCF 160 may ensure that all of the mobile devices in a device group are assigned to the same SMF (e.g., SMF 130) and the same UPF (e.g., UPF 140) for better latency between the members of the device group. Grouping the mobile devices with the same SMF and UPF enables a Multi-Access Edge Computing (MEC) use case for dynamically defined device groups.

The group identifiers corresponding to a mobile device (e.g., UE 110) may be provided to the PCF 160 by the UDR 170. The PCF 160 may use the group identifier to select an SMF (e.g., SMF 130) and push a QoS profile matching the QoS group of the mobile device. The SMF 130 may use the QoS profile and/or the group identifier to select an appropriate UPF (e.g., UPF 140 or UPF 145) and apply the QoS profile rules to the selected UPF. Additionally, the SMF 130 and/or the PCF 160 may use QoS group information for differentiated charging rules based on device group use cases.

Figure 2:
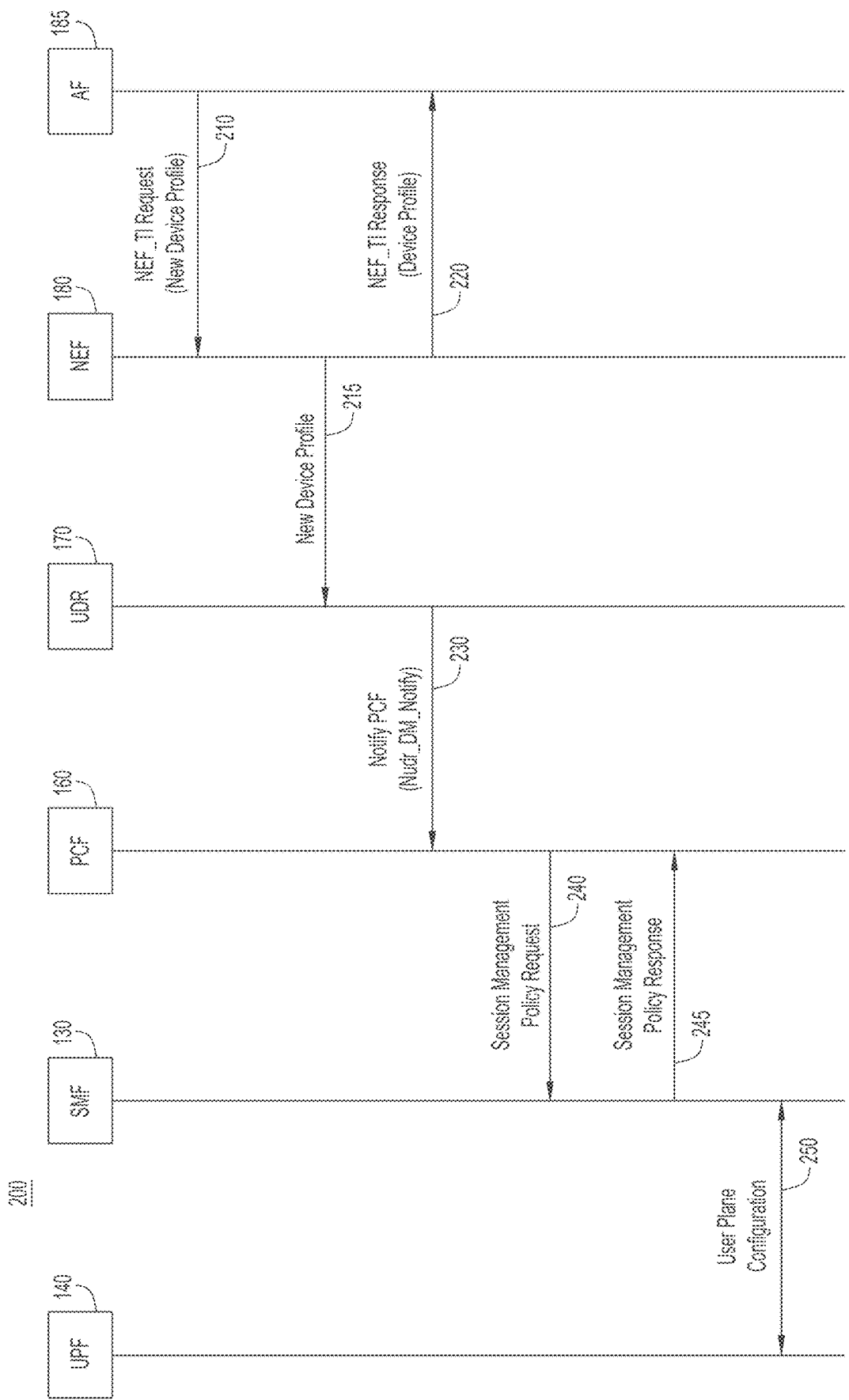
FIG. 2 is a message flow diagram illustrating messages within a network system to provision the network system to support a mobile device, according to an example embodiment.

Referring now to FIG. 2, an example of a message flow 200 in the network system 100 to add a device profile for a mobile device (e.g., UE 110) is shown. FIG. 2 includes UPF 140, SMF 130, PCF 160, UDR 170, NEF 180, and AF 185. Various operations for FIG. 2 are discussed with reference to a mobile device, such as UE 110, however, a mobile device is not shown in FIG. 2 for purposes of brevity only in order to illustrate other features of the network system 100. The AF 185 initiates the message flow by sending a request 210 to the NEF 180. In one example, the request 210 is a Traffic Influence (TI) request that identifies the mobile device and the new device profile.

In one example, the TI sent at 210 may be formatted as any of an Nnef_TrafficInfluence_Create/Update/Delete message/operation, as defined by 3GPP standards. The device profile may include one or more device groups that may be appropriate for the mobile device depending on the device context of the mobile device. For instance, the device profile may include a first device group that is appropriate for a first device context (e.g., general internet traffic) and a second device group for a second device context (e.g., participating in an online conference). A device group may be associated with a QoS group (e.g., specific QoS network settings). However, a device group may be associated with other network settings which may not be specifically designed to affect QoS for network traffic.

The NEF 180 receives the request 210 from the AF 185 and forwards the new device profile 215 to the UDR 170. In one example, the NEF 180 may adjust the format of the new device profile based on requirements and/or preferences of the NEF 180. In another example, the new device profile may include a wildcard entry to enable the new device to join any device group that may be defined in the UDR 170. The NEF 180 sends a response 220 to the AF 185 to confirm that the new device profile has been received and forwarded to the UDR 170.

The UDR 170 stores the new device profile 215 and notifies the PCF 160 of the device profile with a notification 230. In one example, the notification 230 may be formatted as a Nudr_DataManagement(DM)_Notify operation/message, e.g., as described in the 3GPP Technical Specification 23.502. The PCF 160 makes a policy decision on which device group to place the mobile device and sends a session management (SM) policy request 240 to the SMF 130 to support the mobile device with network settings appropriate for the selected device group. In one example, the policy request sent at 240 may be formatted as an Npcf_SM_PolicyControl_Update_Notify_Request message/operation, as defined by 3GPP standards. The SMF 130 acknowledges the session management policy request 240 by sending a session management policy response 245 to the PCF 160, and coordinates in an exchange 250 with the UPF 140 to configure or reconfigure the user plane for the mobile device. In one example, the response sent at 245 may be formatted as an Npcf_SM_PolicyControl_Update_Notify_Response message/operation, as defined by 3GPP standards.

The AF 185 may initiate a similar message flow to update or delete a device profile from the UDR 170 by sending another TI request to the NEF 180. The AF 185 would identify the mobile device and device profile to update/remove in the new TI request, and the other NFs (e.g., NEF 180, UDR 170, PCF 160, SMF 130, and UPF 140) reconfigure the support of the mobile device accordingly, without reconfiguring the mobile device itself.

Although a mobile device, such as UE 110, may be provided with a device group and corresponding network settings (e.g., QoS settings) in the initial provisioning, the PCF 160 may change the device group and corresponding network settings for the UE 110 based on the device context for the UE 110 (e.g., the service requested by the UE 110, the physical location of the UE 110, the time of day, etc.). When a mobile device, such as UE 110, starts or stops a particular application traffic, the AF 185 may use traffic routing procedures (e.g., as described in 3GPP technical specification 23.501) to notify the NEF 180 of the change in application traffic. The NEF 180 may interact with the UDR 170 to update the device profile for the mobile device and create/update/delete one or more device groups for the device profile of the mobile device.

Figure 3:
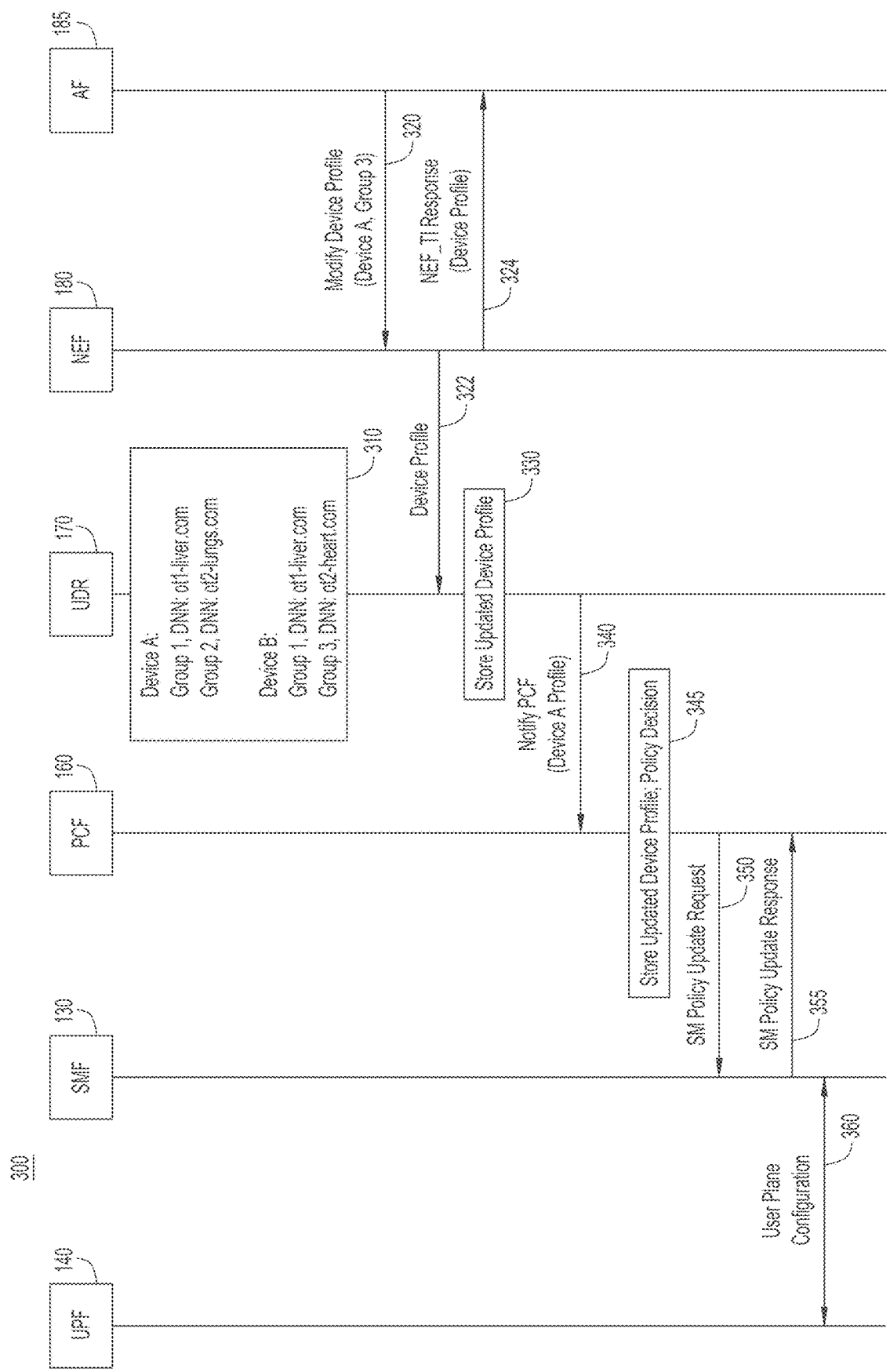
FIG. 3 is a message flow diagram illustrating messages within a network system to update the device profile of a mobile device, according to an example embodiment.

Referring now to FIG. 3, an example of a message flow 300 in the network system supporting a healthcare scheduling system is shown updating a device profile for a mobile device. FIG. 3 includes UPF 140, SMF 130, PCF 160, UDR 170, NEF 180, and AF 185. Various operations for FIG. 3 are discussed with reference to various mobile devices, no mobile devices are shown in FIG. 3 for purposes of brevity only in order to illustrate other features of the network system 100. The UDR 170 includes device profiles 310 for two mobile devices (e.g., device A and device B). The device profile for device A includes two device groups—Group 1 that is appropriate when device A is used in operating theater 1 (e.g., for a liver operation), and Group 2 that is appropriate when device A is used in operating theater 2 (e.g., for an operation on a patient's lungs). Similarly, the device profile for device B includes two device groups—Group 1 that is appropriate when device B is used in operating theater 1 (e.g., for a liver operation), and Group 3 that is appropriate when device B is used in operating theater 2 (e.g., for a heart operation).

In one example, the specific data network (e.g., ot1-liver.com) may be one of the parameters defined by the device group. For instance, all of the devices in a device group may use the same data network to facilitate coordinated usage/latency of data between the devices assigned to the device group. However, a specific data network is not necessarily exclusive to a specific device group. Additionally, a device group may include multiple data networks in certain use cases. In other words, many use cases associate a device group with a specific data network, but some use cases may not associate the data network as a specific parameter of the device group.

The AF 185 sends a request 320 to modify the device profile for one of the devices (e.g., Device A) to the NEF 180. The NEF 180 forwards the device profile 322 to the UDR 170, and sends a response 324 to the AF 185 acknowledging the device profile modification request. In one example, the request 320 and response 324 may be formatted as an NEF_TI exchange. The UDR 170 stores the updated profile at 330 (e.g., adding Group 3 to Device A that is appropriate when Device A is used in operating theater 2 for a heart operation), and sends a notification 340 to the PCF 160 of the updated device profile.

The PCF 160 stores the updated device profile and makes a policy decision on the device group based on the updated device profile at 345. In one example, the PCF 160 may determine that the device A should be switched from Group 2 to Group 3, for instance because the device A is being used in operating theater 2 for a heart operation instead of for a liver operation. The PCF 160 sends a policy update request 350 to the SMF 130, which confirms the policy update with a policy update response 355. Based on the policy decision 345, the SMF 130 and the UPF 140 reconfigure the user plane 360 for the device A. For instance, the SMF 130 may cause the UPF 140 to connect to a different data network that is associated with heart operations in operating theater 2, instead of a data network associated with liver operations in operating theater 2.

In one example, the PCF 160 may determine an appropriate device group for the UE 110, and based on the device context (e.g., device location), the PCF 160 may push network settings (e.g., policy rules) for the device group to the SMF 130 along with a QoS profile for the device group. The SMF 130 may apply the network settings (e.g., QoS rules) for the PDU session of the UE 110 and reconfigure the UPF 140 to use the network settings, if needed. Additionally, the SMF 130 may choose the same UPF 140 for all of the UEs belonging to the same device group, based on network operator policy, and configure the same QoS rules to ensure a consistent quality of experience.

Figure 4A:
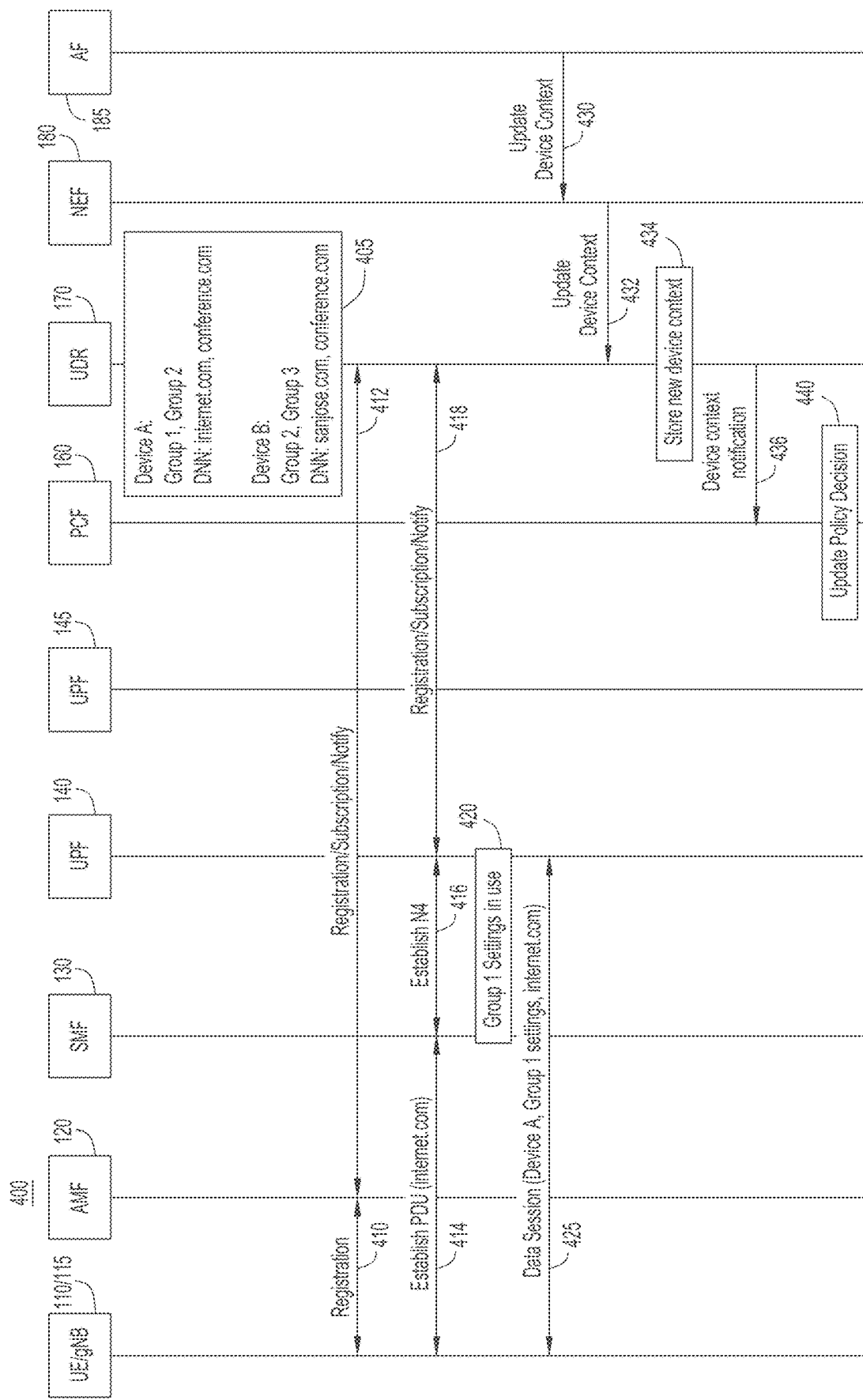
FIG. 4A is a message flow diagram illustrating messages within a network system to update the device context of a mobile device, according to an example embodiment.
Figure 4B:
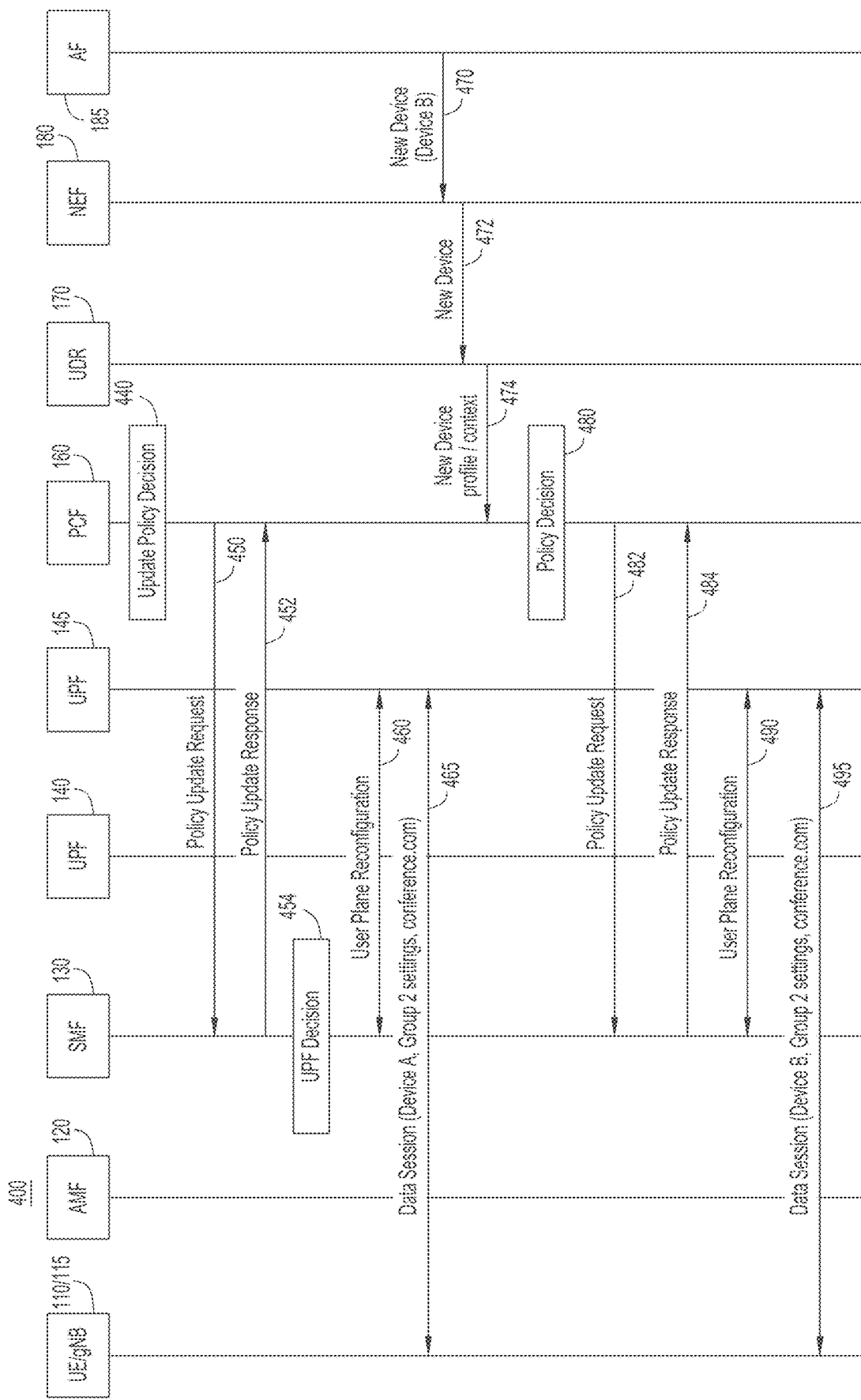
FIG. 4B is a message flow diagram illustrating messages within a network system to update the network settings of a mobile devices based on their device context, according to an example embodiment.

Referring now to FIG. 4A and FIG. 4B, an example of a message flow 400 in the network system supporting an online conferencing application is shown updating a device context for a mobile device. FIGS. 4A and 4B include UE 110, gNB 115, AMF 120, SMF 130, UPF 140, UPF 145, PCF 160, UDR 170, NEF 180, and AF 185. Various operations for FIGS. 4A and 4B are discussed with reference to a UE 110 or other mobile devices, however, messages between the mobile devices (e.g., UE 110) and the gNB 115 are not explicitly shown in FIGS. 4A and 4B. The UE 110 is combined with the gNB 115 in FIGS. 4A and 4B for purposes of brevity only in order to illustrate other features of the network system 100.

The UDR 170 includes device profiles 405 for two mobile devices (e.g., device A and device B). The device profile for device A includes two device groups—Group 1 that is appropriate for general internet data, and Group 2 that is dedicated to an online conference. In one example, Group 2 may be specific to a particular online conference. Alternatively, Group 2 may be appropriate for all online conferences joined by device A. Similarly, the device profile for device B includes two device groups—Group 2 that is dedicated to an online conference, and Group 3 that is appropriate when device B is used in a particular location (e.g., a San Jose corporate campus).

In this example, the gNB 115 registers the UE 110 with the network through the AMF 120 in an exchange 410, and the AMF 120 sends a notification 412 to the UDR 170 about the UE 110 registering with the network. The UE 110 establishes a PDU session in an exchange 414 with the SMF 130. The SMF 130 establishes an N4 connection 416 with the UPF 140 to support the PDU session with the UE 110. In one example, the PCF 160 may provide network settings to the SMF 130 and/or the UPF 140 that determine QoS settings for the PDU session for the UE 110 based on the device group (e.g., Group 1) selected for the UE 110. The UPF 140 and/or the SMF 130 notifies the UDR 170 about the registration and subscription information of the UE 110 in an exchange 418. Once the SMF 130 and the UPF 140 apply the Group 1 settings at 420, the UE 110 may commence a data session 425 through the UPF 140.

The AF 185 detects a change in the device context of the UE 110 (e.g., the UE 110 joined an online conference) and sends an update message 430 to the NEF 180. The update message 430 identifies the device context (e.g., a request to join the online conference, entering a physical conference room associated with the online conference, a predetermined time associated with the online conference, etc.) and may identify the UE 110. In one example, update message 430 may identify PDU session of one or more UEs (e.g., UE 110). In another example, the update sent at 430 may be formatted as any of an Nnef_TrafficInfluence_Create/Update message/operation, that includes an AF service identifier for the AF 185 and a traffic type identifier identifying the traffic for which the update is to be applied. For instance, the traffic type identifier may be represented by a combination of Data Network Name (DNN), Single-Network Slice Selection Assistance Information (S-NSSAI), and/or application identifiers/traffic filtering information, such as a 5-tuple of source IP address, source port number, destination IP address, destination port number, and protocol. The AF service identifier may refer to an application handling user plane traffic for the UE 110 and may be used by the UPF (e.g., UPF 140 or UPF 145) to detect traffic associated with the application.

The NEF 180 passes the device context update 432 to the UDR 170, which stores the new device context at 434. The NEF sends a device context notification 436 to the PCF 160, which updates the policy decision at 440. In one example, the PCF 160 determines that Group 2 is more appropriate for the UE 110 than Group 1, based on the new device context.

As shown in FIG. 4B, the updated policy decision 440 causes the PCF 160 to send a policy update request 450 to the SMF 130, which responds with a policy update response 452. Based on the updated device group (e.g., Group 2) indicated by the policy update request 450, the SMF 130 makes a UPF decision 454, which determines that the UE 110 will join the online conference through UPF 145, i.e., a different UPF than the originally negotiated connection as shown in FIG. 4A. The SMF 130 reconfigures the user plane for the UE 110 in an exchange 460, switching the PDU session for the UE 110 to a different UPF 145. This enables the UE 110 to seamlessly proceed with a data session 465 using the network settings (e.g., QoS settings) associated with Group 2. The network adjusts the network settings associated with UE 110 to address the change in device context without changing the configuration of the UE 110 or re-provisioning the UE 110.

When a new device (e.g., device B) joins the same online conference as the UE 110, the AF 185 sends another notification 470 to the NEF 180 to ensure that the devices in the same online conference are placed in the same device group and supported by the same network settings. The NEF 180 forwards the notification 472 to the UDR 170, which notifies the PCF 160 with a notification 474. The PCF 160 makes a policy decision 480 to place the new device in the same device group (e.g., Group 2).

The PCF 160 sends a policy update request 482 to the SMF 130, which acknowledges the new device in the device group by sending a policy update response 484 to the PCF 160. The SMF 130 reconfigures the user plane for the new device in an exchange 490 to use the same UPF 145 that the UE 110 is using for the online conference. The new device (e.g., device B) is assigned to the same device group (e.g., group 2) with the same network settings as network uses to support the original UE 110 (e.g., device A) in the online conference, and begins to communicate in the online conference through data session 495. In one example, any or all of the devices participating in a particular online conference may be assigned to the same device group to ensure a consistent quality of experience for the online conference.

Figure 5:
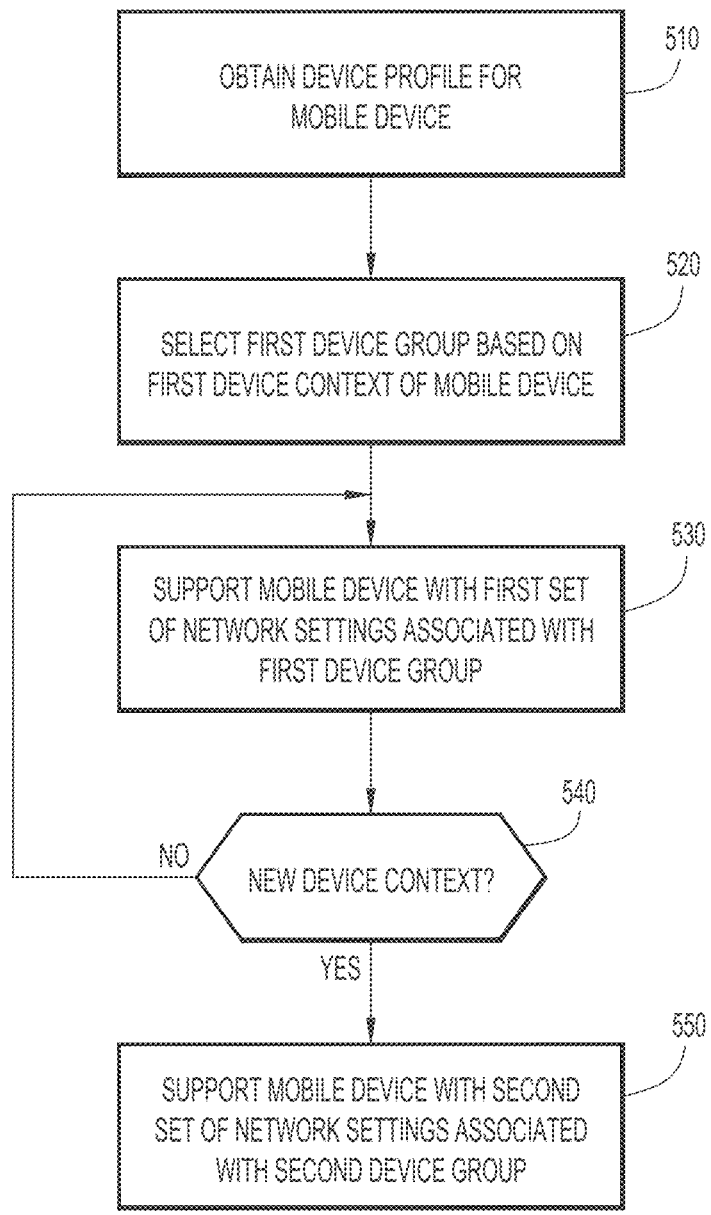
FIG. 5 is a flowchart illustrating operations performed at a Policy Control Function (PCF) in a network system to support a mobile device based on a device context, according to an example embodiment.

Referring now to FIG. 5, a flowchart illustrates operations performed by a network function (e.g., PCF 160) in a process 500 to support a mobile device (e.g., UE 110) with a device profile including multiple device groups. At 510, the network function obtains a device profile for a mobile device. The device profile identifies multiple device groups associated with corresponding set of network settings. In one example, the network settings may include QoS groups. At 520, the network function selects a first device group from the device profile based on a first device context of the mobile device. In one example, the first device context may include the location of the mobile device, the time of day, and/or specific application traffic requested by the mobile device.

At 530, the network function directs at least one other network function to support the mobile device with a first set of network settings corresponding to the first device group. In one example, the PCF (e.g., PCF 160) may direct an SMF (e.g., SMF 130) to support the mobile device with specific QoS settings. Additionally, the PCF may direct the SMF to select a particular UPF (e.g., UPF 140 or UPF 145) corresponding to the first device group.

Until the network function detects a new device context for the mobile device at 540, then the network function continues to support the mobile device with the first set of network settings corresponding to the first device group. If the network function detects a second device context for the mobile device at 540, then the network function directs the at least one other network function support the mobile device with a second set of network settings corresponding to a second device group at 550. In one example, the PCF network function may be notified from the UDR (e.g., UDR 170) that an AF (e.g., AF 185) has updated the device context.

Figure 6:
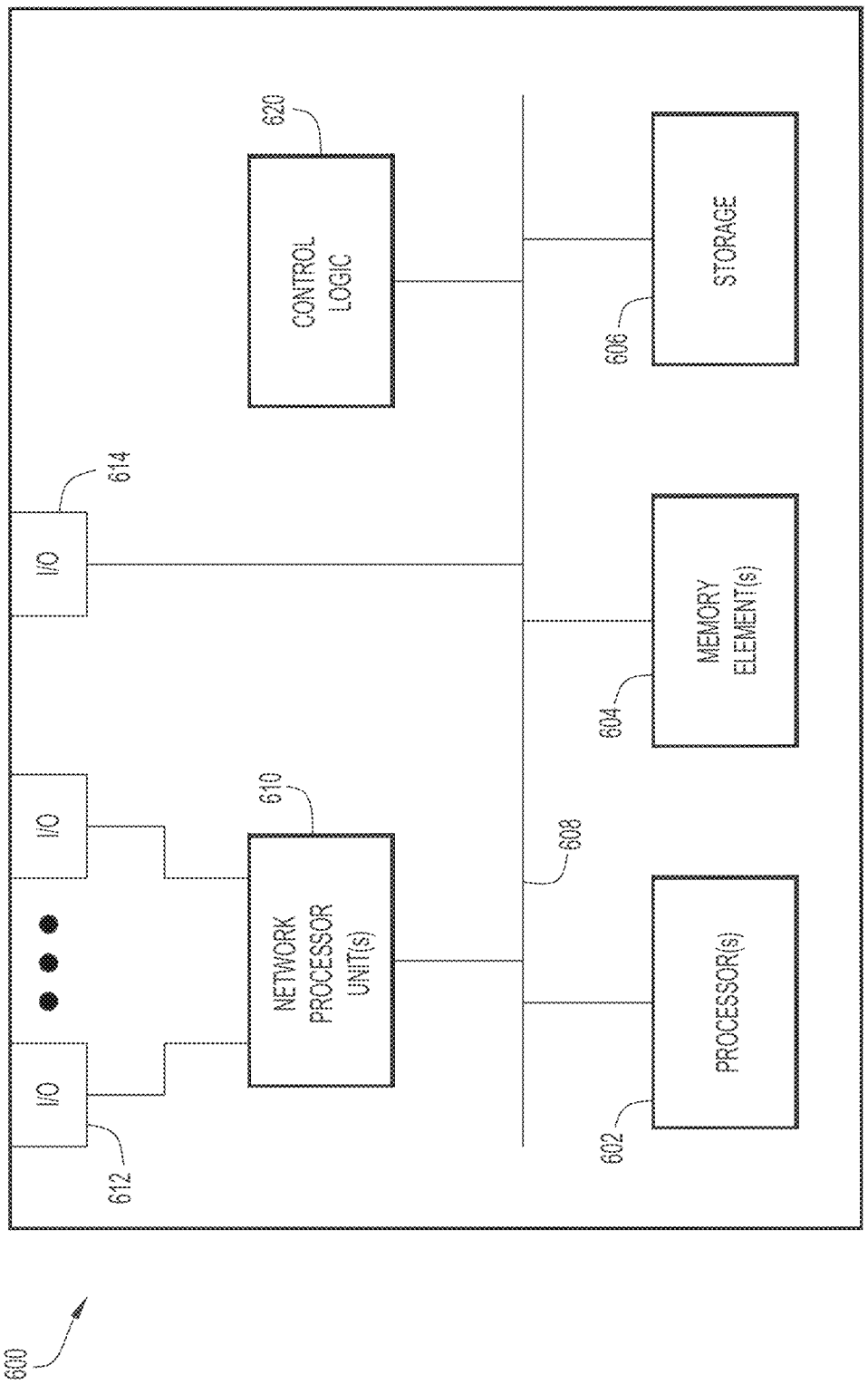
FIG. 6 illustrates a simplified block diagram of a device that may be configured to perform the methods presented herein, according to an example embodiment.

Referring to FIG. 6, FIG. 6 illustrates a hardware block diagram of a computing device 600 that may perform functions associated with operations discussed herein in connection with the techniques depicted in FIGS. 1-3, 4A, 4B, and 5. In various embodiments, a computing device, such as computing device 600 or any combination of computing devices 600, may be configured as any entity/entities as discussed for the techniques depicted in connection with FIGS. 1-3, 4A, 4B, and 5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, the techniques presented herein provide for UE grouping based on QoS needs to better serve the use case for a group of UEs (e.g., Internet of Things (IoT) appliances, hospital instruments, online conference endpoints, etc.). A UE may be part of multiple device groups initially, but based on the service request (e.g., the PDU session request), the network may determine the appropriate device group and network settings to suit the current traffic needs. The network pushes corresponding network settings (e.g., a QoS profile) to support the UE in the current device context of the UE. Additionally, other UEs in the same device group may be supported with the same network settings, and may be attached to the same NF instances to minimize the overall latency and provide a better quality of experience for a data session between UEs of the same device group.

The device groups described herein are dynamic in nature. The AF may influence the selection of the appropriate device group for each mobile device. The determination to select a particular device group for a mobile device may be based on location or any other logic supported by the AF. The device group may also be used by the SMF to ensure that all of the UEs in a particular device group use the same UPF instance. Additionally, the SMF/PCF may use the device group information for differentiated charging rules based on device group use cases.

In one form a method is provided for a network function to selectively support a mobile device with network settings appropriate for a first device context. The method includes obtaining a device profile for the mobile device. The device profile identifies a plurality of device groups, with each device group being associated with a corresponding set of network settings. The method also includes selecting a first device group among the plurality of device groups based on the first device context of the mobile device. The method further includes directing at least one network function in the network to support the mobile device with a first set of network settings corresponding to the first device group.

In another form, an apparatus comprising a network interface and a processor is provided. The network interface is configured to communicate with a plurality of computing devices in a wireless network system. The processor is coupled to the network interface, and configured to obtain a device profile for a mobile device. The device profile identifies a plurality of device groups, with each device group being associated with a corresponding set of network settings. The processor is also configured to select a first device group among the plurality of device groups based on a first device context of the mobile device. The processor is further configured to direct at least one network function in a network to support the mobile device with a first set of network settings corresponding to the first device group.

In still another form, a non-transitory computer readable storage media is provided that is encoded with instructions that, when executed by a processor of network node of a network system, cause the processor to obtain a device profile for a mobile device. The device profile identifies a plurality of device groups, with each device group being associated with a corresponding set of network settings. The instructions also cause the processor to select a first device group among the plurality of device groups based on a first device context of the mobile device. The instructions further cause the processor to direct at least one network function in a network to support the mobile device with a first set of network settings corresponding to the first device group.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims. For instance, the specific IEs described are used as examples of IEs that are currently defined in 3GPP specifications, but the techniques described herein may be adapted to other IEs that may be defined in current or future network specifications.

What is claimed is:

1. A method comprising:
obtaining a device profile for a mobile device, the device profile identifying a plurality of device groups, wherein each device group is associated with a corresponding set of network settings;
selecting a first device group among the plurality of device groups for the mobile device based on a first device context of the mobile device;
directing a Session Management Function (SMF) in a network to support the mobile device with a first set of network settings corresponding to the first device group;
obtaining a notification of the mobile device in a second device context; and
responsive to the notification, selecting a second device group among the plurality of device groups for the mobile device and directing the SMF to support the mobile device with a second set of network settings corresponding to the second device group, the second set of network settings causing the SMF to reconfigure a user plane for the mobile device.

2. The method of claim 1, further comprising:
obtaining one or more additional notifications that one or more additional mobile devices are in the second device context; and
directing the SMF to support the one or more additional mobile devices with the second set of network settings corresponding to the second device group.

3. The method of claim 1, wherein the first device context comprises a first physical location and the second device context comprises a second physical location.

4. The method of claim 1, wherein the second device context comprises participating in an online conference.

5. The method of claim 1, wherein obtaining the notification of the mobile device in the second device context comprises obtaining the notification from an application function through a network exposure function.

6. The method of claim 1, wherein the second set of network settings comprises an indication of a particular User Plane Function (UPF) to support a Protocol Data Unit (PDU) session for the mobile device.

7. The method of claim 6, wherein the second set of network settings causes the SMF to reconfigure the user plane for the mobile device by directing the mobile device to communicate in the PDU session with the particular UPF.

8. An apparatus comprising:
a network interface configured to communicate with a plurality of computing devices in a wireless network system; and
a processor coupled to the network interface, the processor configured to:
obtain a device profile for a mobile device via the network interface, the device profile identifying a plurality of device groups, wherein each device group is associated with a corresponding set of network settings;
select a first device group among the plurality of device groups for the mobile device based on a first device context of the mobile device;
cause the network interface to direct a Session Management Function (SMF) in a network to support the mobile device with a first set of network settings corresponding to the first device group;
obtain via the network interface, a notification of the mobile device in a second device context; and
responsive to the notification, selecting a second device group among the plurality of device groups for the mobile device and causing the network interface to direct the SMF to support the mobile device with a second set of network settings corresponding to the second device group, the second set of network settings causing the SMF to reconfigure a user plane for the mobile device.

9. The apparatus of claim 8, wherein the processor is further configured to:
obtain via the network interface, one or more additional notifications that one or more additional mobile devices are in the second device context; and
cause the network interface to direct the SMF to support the one or more additional mobile devices with the second set of network settings corresponding to the second device group.

10. The apparatus of claim 8, wherein the first device context comprises a first physical location and the second device context comprises a second physical location.

11. The apparatus of claim 8, wherein the second device context comprises participating in an online conference.

12. The apparatus of claim 8, wherein the processor is configured to obtain the notification of the mobile device in the second device context by obtaining the notification from an application function through a network exposure function.

13. The apparatus of claim 8, wherein the second set of network settings comprises an indication of a particular User Plane Function (UPF) to support a Protocol Data Unit (PDU) session for the mobile device.

14. One or more non-transitory computer readable storage media encoded with software comprising computer executable instructions and, when the software is executed on a processor of a network node of a network system, operable to cause the processor to:
obtain a device profile for a mobile device, the device profile identifying a plurality of device groups, wherein each device group is associated with a corresponding set of network settings;
select a first device group among the plurality of device groups for the mobile device based on a first device context of the mobile device;
direct a Session Management Function (SMF) in the network system to support the mobile device with a first set of network settings corresponding to the first device group;
obtaining a notification of the mobile device in a second device context; and
responsive to the notification, selecting a second device group among the plurality of device groups for the mobile device and directing the SMF to support the mobile device with a second set of network settings corresponding to the second device group, the second set of network settings causing the SMF to reconfigure a user plane for the mobile device.

15. The one or more non-transitory computer readable storage media of claim 14, wherein the software is further operable to cause the processor to:
obtain one or more additional notifications that one or more additional mobile devices are in the second device context; and
direct the SMF to support the one or more additional mobile devices with the second set of network settings corresponding to the second device group.

16. The one or more non-transitory computer readable storage media of claim 14, wherein the first device context comprises a first physical location and the second device context comprises a second physical location.

17. The one or more non-transitory computer readable storage media of claim 14, wherein the second device context comprises participating in an online conference.

18. The one or more non-transitory computer readable storage media of claim 14, wherein the software is further operable to cause the processor to obtain the notification of the mobile device in the second device context by obtaining the notification from an application function through a network exposure function.

19. The one or more non-transitory computer readable storage media of claim 14, wherein the second set of network settings comprises an indication of a particular User Plane Function (UPF) to support a Protocol Data Unit (PDU) session for the mobile device.

20. The one or more non-transitory computer readable storage media of claim 19, wherein the second set of network settings causes the SMF to reconfigure the user plane for the mobile device by directing the mobile device to communicate in the PDU session with the particular UPF.

* * * * *